United States Patent
Li (10) Patent No.: US 12,412,426 B2
(45) Date of Patent: Sep. 9, 2025

(54) ACTION RECOGNITION METHOD AND APPARATUS, AND DEVICE AND STORAGE MEDIUM

(71) Applicant: BIGO TECHNOLOGY PTE. LTD., Singapore (SG)

(72) Inventor: Binquan Li, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 390 days.

(21) Appl. No.: 17/999,284

(22) PCT Filed: Apr. 2, 2021

(86) PCT No.: PCT/CN2021/085386
§ 371 (c)(1),
(2) Date: Nov. 18, 2022

(87) PCT Pub. No.: WO2021/232969
PCT Pub. Date: Nov. 25, 2021

(65) Prior Publication Data
US 2023/0196837 A1    Jun. 22, 2023

(30) Foreign Application Priority Data
May 20, 2020    (CN) .......................... 202010431706.9

(51) Int. Cl.
*G06K 9/62*    (2022.01)
*G06N 3/045*    (2023.01)
(Continued)

(52) U.S. Cl.
CPC ............. *G06V 40/20* (2022.01); *G06N 3/045* (2023.01); *G06N 3/08* (2013.01); *G06V 10/764* (2022.01);
(Continued)

(58) Field of Classification Search
None
See application file for complete search history.

(56) References Cited

U.S. PATENT DOCUMENTS 5,612,735 A * 3/1997 Haskell .................. H04N 19/61
                                                    348/E13.058
5,619,256 A * 4/1997 Haskell ................ H04N 13/194
                                                    348/E13.043
(Continued)

FOREIGN PATENT DOCUMENTS

CN    106407889 A  *  2/2017    ......... G06K 9/00765
CN    108280436 A  *  7/2018
(Continued)

OTHER PUBLICATIONS

Wu et al., "Compressed Video Action Recognition," 2018 IEEE/CVF Conference on Computer Vision and Pattern Recognition, Salt Lake City, UT, USA, 2018, pp. 6026-6035 (Year: 2018).*
(Continued)

*Primary Examiner* — Feng Niu
(74) *Attorney, Agent, or Firm* — Kolitch Romano Dascenzo Gates LLC (57) ABSTRACT

Provided is an action recognition method. The method includes: acquiring grouped video data by grouping original compressed video data; inputting the grouped video data into a first predetermined model, and determining, based on an output result of the first predetermined model, target grouped video data containing an action; acquiring to-be-recognized grouped video data by decoding the target grouped video data; and inputting the to-be-recognized grouped video data into a second predetermined model, and determining, based on an output result of the second predetermined model, a type of an action contained in the to-be-recognized grouped video data.

18 Claims, 7 Drawing Sheets

(51) Int. Cl.

| | | |
|---|---|---|
| *G06N 3/08* | (2023.01) | |
| *G06V 10/764* | (2022.01) | |
| *G06V 10/77* | (2022.01) | |
| *G06V 10/80* | (2022.01) | |
| *G06V 10/82* | (2022.01) | |
| *G06V 20/40* | (2022.01) | |
| *G06V 40/20* | (2022.01) | |
| *H04N 19/172* | (2014.01) | |
| *H04N 19/513* | (2014.01) | |
| *H04N 19/52* | (2014.01) | |

(52) U.S. Cl.
CPC ........ *G06V 10/7715* (2022.01); *G06V 10/806* (2022.01); *G06V 10/82* (2022.01); *G06V 20/40* (2022.01); *G06V 20/41* (2022.01); *G06V 20/44* (2022.01); *G06V 20/46* (2022.01); *G06V 20/49* (2022.01); *H04N 19/172* (2014.11); *H04N 19/513* (2014.11); *H04N 19/52* (2014.11)

(56) References Cited

U.S. PATENT DOCUMENTS

| | | | | |
|---|---|---|---|---|
| 6,055,012 | A * | 4/2000 | Haskell | H04N 19/82 |
| | | | | 348/E13.058 |
| 8,345,984 | B2 * | 1/2013 | Ji | G06N 3/045 |
| | | | | 382/156 |
| 10,528,819 | B1 * | 1/2020 | Manmatha | G06V 10/764 |
| 10,691,949 | B2 * | 6/2020 | Danielsson | G06V 20/41 |
| 10,909,424 | B2 * | 2/2021 | Kwan | G06V 10/147 |
| 11,501,532 | B2 * | 11/2022 | Gan | G06N 3/045 |
| 11,568,545 | B2 * | 1/2023 | Manmatha | G06F 3/04812 |
| 12,219,289 | B2 * | 2/2025 | Zhao | H04N 23/667 |
| 2004/0005004 | A1 * | 1/2004 | Demos | H04N 19/137 |
| | | | | 375/E7.22 |
| 2009/0249208 | A1 * | 10/2009 | Song | G11B 27/3081 |
| | | | | 715/721 |
| 2011/0182469 | A1 | 7/2011 | Ji et al. | |
| 2012/0218473 | A1 * | 8/2012 | Xu | H04N 19/537 |
| | | | | 348/E5.066 |
| 2018/0137362 | A1 * | 5/2018 | Danielsson | G06V 10/95 |
| 2020/0143457 | A1 * | 5/2020 | Manmatha | G06F 3/04812 |
| 2020/0160110 | A1 * | 5/2020 | Kwan | H03M 7/3062 |
| 2020/0342234 | A1 * | 10/2020 | Gan | G06V 20/46 |
| 2021/0216785 | A1 * | 7/2021 | Debucean | G06F 18/2415 |
| 2021/0342924 | A9 * | 11/2021 | Manmatha | G06T 7/20 |
| 2022/0301351 | A1 * | 9/2022 | Zhao | G06T 7/215 |

FOREIGN PATENT DOCUMENTS

| | | | | | |
|---|---|---|---|---|---|
| CN | 109522867 | A | * | 3/2019 | |
| CN | 110163052 | A | * | 8/2019 | ........ G06K 9/00335 |
| CN | 110414335 | A | | 11/2019 | |
| CN | 110490055 | A | * | 11/2019 | |
| CN | 110490078 | A | * | 11/2019 | ........ G06F 18/2415 |
| CN | 110826545 | A | | 2/2020 | |
| CN | 111080699 | A | * | 4/2020 | .......... G06N 3/0454 |
| CN | 111598026 | A | | 8/2020 | |

OTHER PUBLICATIONS

Jappie et al., "Summarynet: a multi-stage deep learning model for automatic video summarisation." arXiv preprint arXiv:2002.09424 (2020). (Year: 2020).*
Qi et al., "Sports Video Captioning via Attentive Motion Representation and Group Relationship Modeling," in IEEE Transactions on Circuits and Systems for Video Technology, vol. 30, No. 8, pp. 2617-2633, Aug. 2020 (published on Jun. 7, 2019). (Year: 2019).*
Ehsani et al., "Who Let the Dogs Out? Modeling Dog Behavior from Visual Data, " 2018 IEEE/CVF Conference on Computer Vision and Pattern Recognition, Salt Lake City, UT, USA, 2018, pp. 4051-4060 (Year: 2018).*
Zolfaghari et al., "Eco: Efficient convolutional network for online video understanding." In Proceedings of the European conference on computer vision (ECCV), pp. 695-712. 2018. (Year: 2018).*
CN 111080699 A (machine translation) (Year: 2020).*
CN 106407889 A (machine translation) (Year: 2017).*
CN 110490078 A (machine translation) (Year: 2019).*
CN 108280436 A (machine translation) (Year: 2018).*
CN 110490055 A (machine translation) (Year: 2019).*
CN 110163052 A (machine translation) (Year: 2019).*
CN 109522867 A (machine translation) (Year: 2019).*
Communication pursuant to Rule 164(1) EPC of counterpart European application No. 21808837.5 issued on Jun. 6, 2024, which is a foreign counterpart application to this application.
Extended European Search Report Communication Pursuant to Rule 62 EPC for European Application No. 21808837.5 dated Aug. 27, 2024, which is a foreign counterpart application to this application.
Chadha Aaron, et al., "Video Classification With CNNs: Using the Codec as a Spatio-Temporal Activity Sensor", IEEE Transactions on Circuits and Systems for Video Technology, IEEE, USA, vol. 29, No. 2, Feb. 1, 2019, pp. 475-485, ISSN: 1051-8215, DOI:10.1109/TCSVT.2017.2786999, abstract, IV in particular p. 479, left column second paragraph; p. 477, left column; p. 478; p. 477, right column, second paragraph.
Liu, Zhaoyang, et al., "TEINet: Towards an Efficient Architecture for Video Recognition", arxiv.org, Cornell University Library, 201 Olin Library Cornell University Ithaca, NY 14853, Nov. 21, 2019, Figures: 1; abstract; p. 11670, left column third paragraph.
International Search Report of the International Searching Authority for State Intellectual Property Office of the People's Republic of China in PCT application No. PCT/CN2021/085386 issued on Jul. 2, 2021, which is an International application to which this application claims priority.

\* cited by examiner

| Labels | 0 | 1 | 0 | 1 | 0 | 0 |
|---|---|---|---|---|---|---|
| Video Segments | S1 | A1 | S3 | A2 | S5 | S6 |

ACTION RECOGNITION METHOD AND APPARATUS, AND DEVICE AND STORAGE MEDIUM

CROSS-REFERENCE TO RELATED APPLICATION

This application is a U.S. national stage of international application No. PCT/CN2021/085386, filed on Apr. 2, 2021, which claims priority to Chinese Patent Application No. 202010431706.9 filed on May 20, 2020, the disclosures of which are incorporated herein by reference in their entireties.

TECHNICAL FIELD

Embodiments of the present disclosure relate to the technical field of computer vision application, and in particular, relates to an action recognition method and apparatus, a device, and a storage medium.

BACKGROUND

Video-based action recognition is an important part of computer vision research. Implementation of video-based action recognition mainly includes feature extraction and representation, and feature classification. Classical methods such as density trajectory tracking are generally manual feature design methods. In recent years, people found that deep learning has a powerful feature representation capability. Therefore, an action recognition method based on a neural network gradually becomes a mainstream method in the field of action recognition. In comparison with the manual feature design methods, performance of the action recognition by the method based on a neural network is greatly improved.

SUMMARY

An overview of subject matters detailed in the present disclosure is provided below, which is not intended to limit protection scope of claims.

According to some embodiments of the present disclosure, an action recognition method is provided. The method includes: acquiring grouped video data by grouping original compressed video data; inputting the grouped video data into a first predetermined model and determining, based on an output result of the first predetermined model, target grouped video data containing an action; acquiring to-be-recognized grouped video data by decoding the target grouped video data; and inputting the to-be-recognized grouped video data into a second predetermined model and determining, based on an output result of the second predetermined model, a type of an action contained in the to-be-recognized grouped video data.

According to some embodiments of the present disclosure, an action recognition apparatus is provided. The apparatus includes: a video grouping module, a target grouped video determining module, a video decoding module and an action type recognition module.

The video grouping module is configured to acquire grouped video data by grouping original compressed video data. The target grouped video determining module is configured to input the grouped video data into a first predetermined model and determine, based on an output result of the first predetermined model, target grouped video data containing an action. The video decoding module is configured to acquire to-be-recognized grouped video data by decoding the target grouped video data. The action type recognition module is configured to input the to-be-recognized grouped video data into a second predetermined model and determine, based on an output result of the second predetermined model, a type of an action contained in the to-be-recognized grouped video data.

According to some embodiments of the present disclosure, an action recognition computer device is provided. The action recognition computer device includes a memory, a processor, and a computer program stored in the memory and executable on the processor. The processor, when loading and executing the computer program, is caused to perform the action recognition method provided in the embodiments of the present disclosure.

According to some embodiments of the present disclosure, a non-transitory computer-readable storage medium storing a computer program therein is provided. The computer program, when loaded and executed by a processor, cause the processor to perform the action recognition method provided in the embodiments of the present disclosure.

DETAILED DESCRIPTION

The present disclosure is described in detail below with reference to the accompanying drawings and embodiments. It is understandable that exemplary embodiments described herein merely serve to explain the present disclosure, and do not constitute an improper limitation of the present disclosure. It should be noted that for convenience of description, only a partial structure related to the present disclosure rather than all the structure is shown in the accompany drawings. In addition, the embodiments in the present disclosure and characteristics in the embodiments can be mutually combined in the case of no conflict.

Action recognition solutions in the embodiments of the present disclosure is applied to various action recognition scenarios for videos, such as a short video review scenario, a video monitoring scenario, a real-time call recognition scenario, and a robot vision recognition scenario. The video is a video file or a video stream.

At present, in most neural network-based action recognition solutions, an action is determined by constructing a time sequence relationship based on sequence images acquired from a video. For example, a time sequence of images is constructed based on an recurrent neural network (RNN), a long short-term memory (LSTM) network, or the like, time sequence information of a plurality of images is extracted based on 3D convolution, and optical flow information of an action change is superimposed based on deep learning of images.

The short video review scenario is taken as an example. Action recognition methods based on sequence images have at least the following two deficiencies. First, these technical solutions all require a lot of computing resources to make a judgment on a short video and heavily rely on computing power of a central processing unit (CPU) and a graphics processing unit (GPU) of a machine. In addition, extracting images from a compressed short video requires decoding (a technology for decoding a compressed video into images). However, full-time long-term decoding of the short video requires a lot of CPU and GPU computing power. Consequently, the image-based action recognition solutions require high computing power of the machine. As an interval for acquiring frames from the short video decreases, there is a linear growth relationship between demand for computing resources and duration of the short video. Secondly, in the technical solutions based on the RNN and optical flow, machine review accuracy is low. To ensure a recall rate of a target action, a push ratio of machine review is bound to increase, resulting in more labor demand during manual review and higher review costs. It is learned therefrom that the foregoing solutions have a problem that a computing amount and recognition accuracy cannot be both considered and need to be improved. The problem also exists in other similar application scenarios in addition to the short video review scenario.

Figure 1:
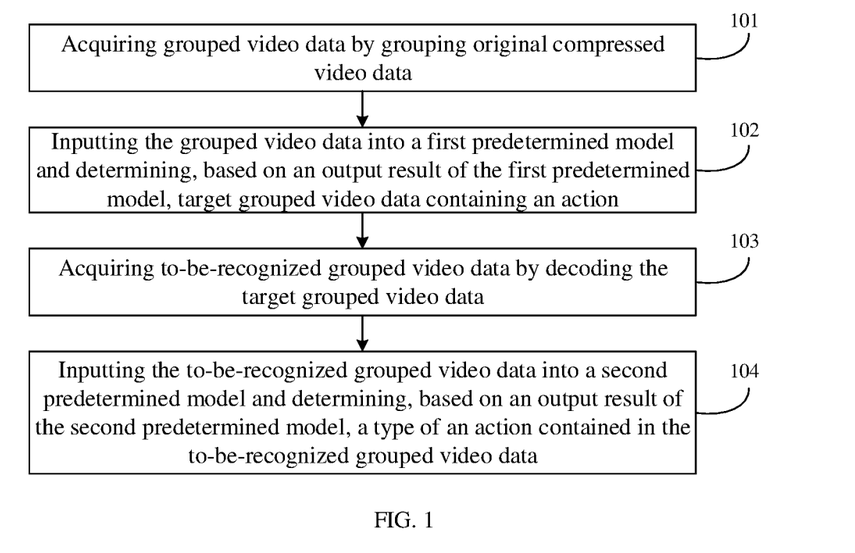
FIG. 1 is a schematic flowchart of an action recognition method according to some embodiments of the present disclosure.

FIG. 1 is a schematic flowchart of an action recognition method according to some embodiments of the present disclosure. The method is performed by an action recognition apparatus. The apparatus is implemented by software and/or hardware, and generally integrated in a computer device. The computer device is a server or a device such as a mobile phone. Or two or more devices are configured to respectively perform some processes of the method. As shown in FIG. 1, the method includes the following processes.

In 101, grouped video data is acquired by grouping original compressed video data.

In some embodiments, a large amount of image and sound information are contained in video data. Generally, compressed video data is acquired by compressing and encoding the video data during transmission or storage. The compressed video data is referred to as the original compressed video data in the embodiments of the present disclosure. An encoding standard and an encoding parameter are not limited. For example, H.264, H.265, or MPEG-4 is used for encoding.

In some embodiments, interval compressed videos (hereinafter referred to as segments for short) are acquired by performing interval division on the original compressed video data based on a predetermined grouping rule. The interval compressed video is taken as the grouped video data, or some data is selected from the interval compressed video as the grouped video data. The predetermined grouping rule includes an interval division time interval, that is, duration corresponding to each interval compressed video after the interval division. The interval division time interval is constant or variable, which is not limited. Taking a short video review scenario as an example, the interval division time interval is 5 seconds. Alternatively, the predetermined grouping rule includes a number of intervals, wherein the number is not limited.

It should be noted that although the interval compressed video is referred to as the segment for short in this specification, this is only for convenience of description, and the grouping and interval division do not involve segmenting or cutting the original compressed video to avoid introducing additional computing power and storage and ensure efficiency of engineering development. The grouping and interval division are completed by using timestamps. That is, a range of the grouped video data or the interval compressed video is limited by start and end timestamps. This process is understood as extracting data of different time periods from the original compressed video data and separately inputting the data to a first predetermined model. The interval division time interval being 5 seconds is taken as an example. Data corresponding to 0 s to 5 s in the original compressed video is a segment of grouped video data, and data corresponding to 5 s to 10 s is a segment of grouped video data. The 2 segments of data are separately input into the first predetermined model.

In 102, the grouped video data is input into the first predetermined model, and target grouped video data containing an action is determined based on an output result of the first predetermined model.

In some embodiments, during grouping the original compressed video data, when a segment of grouped video data is acquired, the segment is input into the first predetermined model to improve computing efficiency. Or all segments of grouped video data are input into the first predetermined model in sequence or in parallel after the grouping is completed, thereby ensuring that coarse-grained action recognition is performed after the grouping is accurately completed.

In some embodiments, the first predetermined model is a pre-trained neural network model, which is directly loaded when needed to be used. The model is mainly configured to recognize whether an action is contained in the grouped video data, regardless of which action it is. An action label is determined as binary classification, such as "yes" and "no." Binary classification labels are marked on training samples of the first predetermined model. In this way, segments containing actions are acquired based on the output result of the first predetermined model, and the corresponding grouped video data is determined as the target grouped video data. Since a type of an action does not need to be recognized, that is, only coarse-grained recognition is performed, a computing amount of the first predetermined model is small. In addition, the recognition is performed without decoding, such that a lot of decoding computing power is saved. Meanwhile, a large number of video segments containing no action are excluded, and video segments containing an action are retained for subsequent recognition.

A network structure and related parameters of the first predetermined model are not limited in the embodiments of the present disclosure, which is determined based on actual requirements. For example, the first predetermined model is a lightweight model.

In 103, to-be-recognized grouped video data is acquired by decoding the target grouped video data.

In some embodiments, an appropriate decoding manner is selected with reference to factors such as an encoding standard of the original compressed video, which is not limited. After the target grouped video data is decoded, acquired video images is taken as the to-be-recognized grouped video data (the decoded video images are generally arranged in a time sequence, namely, sequence images, and the to-be-recognized grouped video data includes time sequence information of the video images). Other information are further extracted and contained in the to-be-recognized grouped video data. The other information may be frequency domain (FD) information.

In 104, the to-be-recognized grouped video data is input into a second predetermined model, and a type of an action contained in the to-be-recognized grouped video data is determined based on an output result of the second predetermined model.

In some embodiments, the second predetermined model is a pre-trained neural network model, which is directly loaded when needed to be used. The model is mainly configured to recognize the type of action contained in the to-be-recognized grouped video data, that is, to perform fine-grained recognition. Multi-classification labels are marked in training samples of the second predetermined model, such that a final action recognition result is determined based on the output result of the second predetermined model. After the preliminary screening in the foregoing processes, data input in the second predetermined model is greatly reduced compared with the original compressed video data, and data purity is much higher than that of the original compressed video data. A number of video segments to be recognized has a low order of magnitude, such that the decoded sequence images can be used for recognition. In some embodiments, time sequence features are extracted by using a 3D convolutional network structure with many neural network parameters, and labels are multi-classified and finer-grained. A number of labels is not limited, for example 50, which is adjusted based on recognition accuracy.

In the action recognition method provided in the embodiments of the present disclosure, the grouped video data is acquired by grouping the original compressed video data; the grouped video data is input into the first predetermined model, and the target grouped video data containing the action is determined based on the output result of the first predetermined model; the to-be-recognized grouped video data is acquired by decoding the target grouped video data; and the to-be-recognized grouped video data is input into the second predetermined model, and the type of the action contained in the to-be-recognized grouped video data is determined based on the output result of the second predetermined model. In the foregoing technical solutions, before a compressed video is decompressed, the video segment containing the action is acquired by using the first predetermined model to perform rough screening, and then the type of the contained action is accurately recognized by using the second predetermined model, such that the computing amount is effectively reduced on the premise of ensuring the recognition accuracy, and action recognition efficiency is improved.

It should be noted that in some application scenarios such as video review, a client for video uploading and a server for video review are generally included. Processes 101 and 102 are performed on the client due to a small computing amount, that is, the client performs the preliminary screening on a compressed video to be uploaded and upload the target grouped video data containing the action to the server for recognition and review. In addition, for some devices with high configuration, the entire recognition process, namely, processes 101 to 104, alternatively are performed on the client to implement control such as determining whether to allow video uploading based on the finally recognized type of the action.

In some embodiments, acquiring the grouped video data by grouping the original compressed video data includes: acquiring interval compressed video by performing interval division on the original compressed video data based on the predetermined grouping rule; and acquiring the grouped video data by extracting I frame data and P frame data in each of the interval compressed videos based on a predetermined extraction policy, wherein the P frame data includes motion vector (MV) information and/or pigment change residual information corresponding to a P frame. In the technical solutions provided in the embodiments of the present disclosure, feature data that is used for action recognition in the compressed video data is rapidly extracted, and the recognition efficiency is improved.

An I frame, also referred to as a key frame, is an image included in the compressed video. The P frame, also referred to as a forward-predicted frame, generally includes change information of a reference I frame in the compressed video, the P frame includes MV information and RGB residual frame (RGBR) information. One I frame is generally followed by a plurality of P frames, and distribution or content of the I frame and the P frame may be different in different encoding modes. For example, the predetermined grouping rule is as described above, and includes the interval division time interval or the number of segments. The predetermined extraction policy includes an I frame extraction policy and a P frame extraction policy. The I frame extraction policy includes a time interval for acquiring the I frame or a number of I frames acquired in a unit time, such as 1 I frame per second. The P frame extraction policy includes a number of P frames acquired following the I frame and a time interval between every two P frames acquired. For example, the number is 2. An interval compressed video whose duration is 5 seconds is taken as an example. Data corresponding to 5 I frames and 10 P frames are acquired. In a case that the P frame data includes both MVs and RGBRs, 10 MVs and 10 RGBRs are acquired.

In some embodiments, the first predetermined model includes a first 2D residual network, a first concatenation layer, and a first fully connected (FC) layer. Feature maps with a same dimension is acquired by inputting the grouped video data into the first predetermined model and processing the grouped video data by the first 2D residual network. A concatenated feature map is acquired by concatenating the feature maps by the first concatenation layer based on a frame sequence. A classification result of whether an action is contained is acquired by processing the concatenated feature map by the first FC layer. In the technical solutions provided in the embodiments of the present disclosure, a simple network result is used to achieve high recognition efficiency, and a high recall rate of video segments containing an action is ensured.

For example, the first 2D residual network uses a lightweight ResNet18 model. Because the I frame, MV, and RGBR cannot be directly concatenated in terms of data features, the feature maps with the same dimension are acquired by using 3 ResNet18 models to separately process the I frame, MV, and RGBR, which are denoted as an I frame feature map, an MV feature map, and an RGBR feature map. The MV feature map and the RGBR feature map are collectively referred to as P frame feature maps. The same dimension means that C*H*W are identical, wherein C represents a channel, H represents a height, W represents a width, and * may be represented as x. After the processing, the feature maps with the same dimension are concatenated by the first concatenation layer.

In some embodiments, acquiring the grouped video data by extracting the I frame data and the P frame data in each of the interval compressed videos based on the predetermined extraction policy includes: extracting the I frame data and the P frame data in each of the interval compressed videos based on the predetermined extraction policy; cumulatively transforming the P frame data such that transformed P frame data depends on the forward adjacent I frame data; and determining the grouped video data based on the I frame data and the transformed P frame data. Correspondingly, the first predetermined model further includes an addition layer located before the concatenation layer, a feature map corresponding to the P frame data in the feature maps is denoted as the P frame feature map, and a feature map corresponding to the I frame data in the feature maps is denoted as the I frame feature map. A P frame feature map to which the I frame feature map is added is acquired by processing the P frame feature map and the I frame feature map by the addition layer. The concatenated feature map is acquired by concatenating the I frame feature map and the P frame feature map acquired upon the addition by the first concatenation layer based on the frame sequence. In the technical solutions provided in the embodiments of the present disclosure, a closer information association with the I frame is provided through the cumulative transformation, and more comprehensive information to be recognized is provided through the addition in the neural network.

Figure 2:
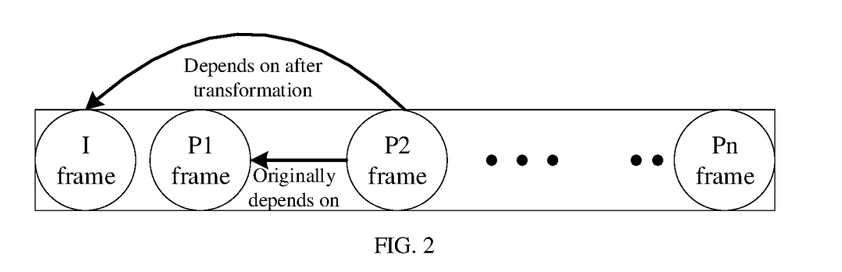
FIG. 2 is a schematic diagram of frame arrangement in a compressed video according to some embodiments of the present disclosure.

H.264 is taken as an example. FIG. 2 is a schematic diagram of frame arrangement in a compressed video according to some embodiments of the present disclosure. As shown in FIG. 2, from a second P frame, an MV and RGBR of each P frame depend on a previous P frame (for example, a P2 frame depends on a P1 frame). The MV and RGBR of the P frame are cumulatively transformed to make a correlation between the P frame and the I frame closer, and the MV and RGBR of the P frame acquired and input into the neural network are relative to the previous I frame (for example, the P2 frame becomes dependent on the previous I frame after the cumulative transformation), rather than relative to the previous P frame. The addition is directly adding the MV feature map and the RGBR feature map to the output of the I frame (I frame feature map acquired after the processing of the first 2D residual network) based on each element (pixel) by referring to a residual addition manner in ResNet. Then, the 3 feature maps are concatenated based on the frame sequence.

In some embodiments, an (feature shift) FS layer is included in the first predetermined model, wherein the FS layer is before a residual structure of the first 2D residual network. Up-shifted and/or down-shifted grouped video data is acquired by processing the grouped video data by the FS layer prior to being input into the residual structure. In the technical solutions provided in the embodiments of the present disclosure, before the feature map is input into the residual structure, that is, before a convolution is performed, some features of the feature map are shifted. In this way, the feature map includes some features in feature maps at different time points. When the convolution is performed, the feature map includes time sequence information. The time sequence information is acquired and fused on the premise of basically not increasing the computing amount. Information about the feature map to be recognized is enriched, and the recognition accuracy is improved. In comparison with a solution based on 3D convolution or optical flow information in the related art, the computing amount is effectively reduced.

Figure 3:
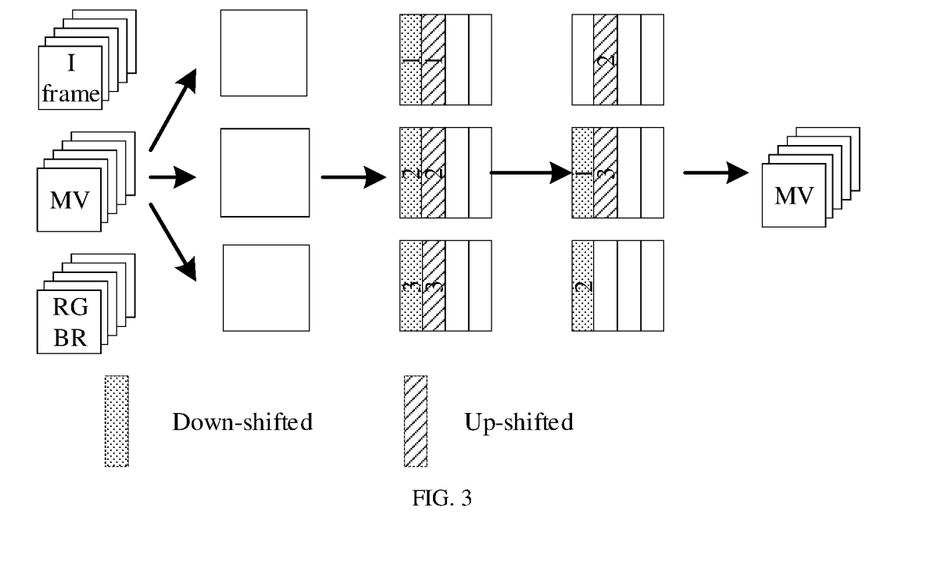
FIG. 3 is a schematic diagram of feature shift (FS) according to some embodiments of the present disclosure.

For example, FIG. 3 is a schematic diagram of feature shift (FS) according to some embodiments of the present disclosure. As shown in FIG. 3, the MV feature map is taken as an example. For convenience of description, FIG. 3 shows only a process of performing FS on 3 MV feature maps. The 3 MV feature maps correspond to different time points. It is assumed that each of the MV feature maps is divided into 4 parts, a first part is down-shifted, and a second part is up shifted. The second MV feature map after the FS includes some features of the MV feature maps at 3 time points. In practical application, a division rule and a part that is up-shifted and/or down-shifted may be determined based on an actual situation.

In some embodiments, extracting the P frame data in each of the interval compressed videos based on the predetermined extraction policy includes: extracting a predetermined number of P frame data in each of the interval compressed videos in an equal-interval manner; wherein a predetermined number of P frame data in each of the interval compressed videos is extracted in a random-interval manner during training of the first predetermined model. In the technical solutions provided in the embodiments of the present disclosure, robustness of the first predetermined model is improved.

Figure 4:
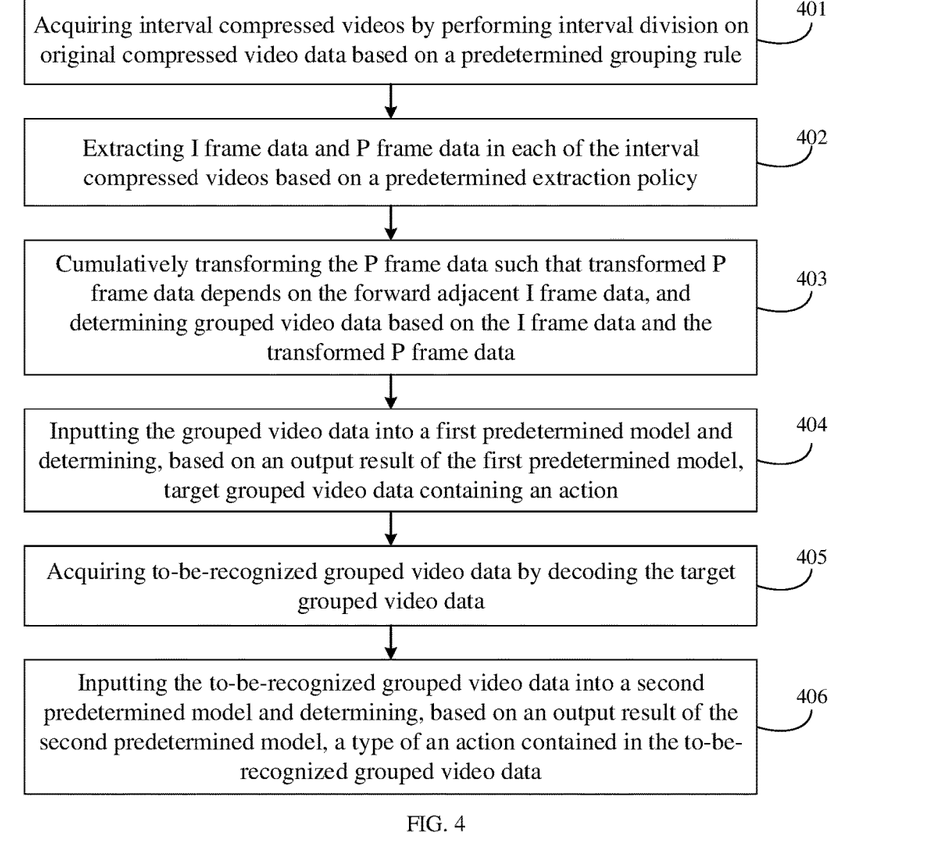
FIG. 4 is a schematic flowchart of another action recognition method according to some embodiments of the present disclosure.

FIG. 4 is a schematic flowchart of another action recognition method according to some embodiments of the present disclosure. Refinement is performed based on the foregoing exemplary embodiments. For example, the method includes the following processes.

In 401, interval compressed videos are acquired by performing interval division on original compressed video data based on a predetermined grouping rule.

In some embodiments, the original compressed video is enhanced by using a predetermined video and image enhancement policy. The enhancement policy is selected based on data requirements of business and configurations such as a driver. A same enhancement policy may be used during model training and model application.

In 402, I frame data and P frame data in each of the interval compressed videos are extracted based on a predetermined extraction policy.

The P frame data includes MV information and/or pigment change residual information corresponding to a P frame.

In 403, the P frame data is cumulatively transformed such that transformed P frame data depends on the forward adjacent I frame data, and grouped video data is determined based on the I frame data and the transformed P frame data.

In 404, the grouped video data is input into a first predetermined model, and target grouped video data containing an action is determined based on an output result of the first predetermined model.

Figure 5:
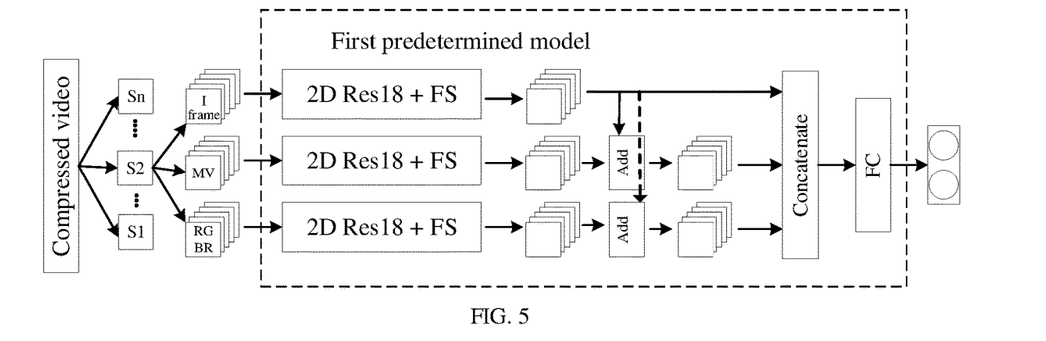
FIG. 5 is a schematic diagram of an action recognition process based on a compressed video stream according to some embodiments of the present disclosure.

For example, FIG. 5 is a schematic diagram of an action recognition process based on a compressed video stream according to some embodiments of the present disclosure. A compressed video is divided into n segments, and segment 2 (S2) is taken as an example. The extracted I frame data, MV data, and RGBR data are input into the first predetermined model. The first predetermined model includes a first 2D residual network, an addition layer (Add), a first concatenation layer (Concatenate), and a first fully connected layer (FC). The first 2D residual network is 2D Res18, and a feature shift layer (FS) is included in the first predetermined model, wherein the FS layer is before a residual structure thereof. In some embodiments, during the training of the first predetermined model, a training manner is selected based on actual requirements, including a loss function or the like. For example, the loss function uses cross entropy. Other auxiliary loss functions may further be used to improve a model effect. In addition, some non-heuristic optimization algorithms are used to improve a convergence speed of stochastic gradient descent and optimize performance.

Figure 6:
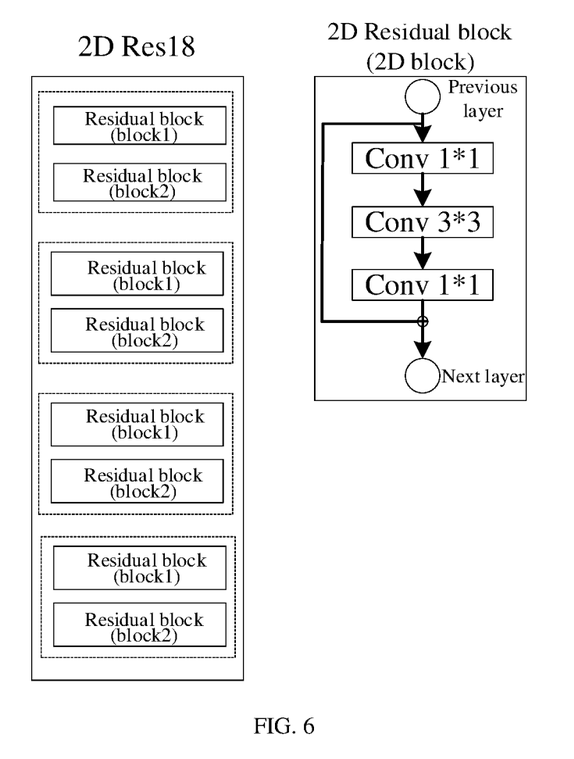
FIG. 6 is a schematic diagram of a structure of a first 2D residual network according to some embodiments of the present disclosure.

FIG. 6 is a schematic diagram of a structure of a first 2D residual network according to some embodiments of the present disclosure. As shown in FIG. 6, 2D Res18 is an 18-layer residual neural network composed of 8 residual blocks using 2D convolution in 4 stages. A network structure is shallow. To fully extract features by using convolution layers as much as possible, the 8 2D residual blocks uses 3*3 convolution, that is, a convolution kernel parameter is 3*3. The convolution layer is generally a network layer used to perform weighted summation of local pixel values and nonlinear activation. To reduce a number of channels for the operation of the convolution layer and further reduce a number of parameters, each 2D residual block uses a design concept of bottleneck, that is, each residual block is composed of 3 convolution layers (whose convolution kernel parameters are 1*1, 3*3, and 1*1). A first layer and a last layer are separately used to compress and restore image channels. The structure and parameters of the first 2D residual network are alternatively adjusted based on actual requirements.

As shown in FIG. 5, up-shifted and down-shifted I frame data, MV data, and RGBR data are acquired by separately processing the I frame data, MV data, and RGBR data by the FS layer prior to being input into the 2D Res18 residual structure (namely, 2D residual block). Then, feature maps with same C*H*W are acquired by processing the shifted data by the residual structure. The MV feature map and the RGBR feature map are added by the addition layer to the output of the I frame based on each element by referring to a residual addition manner in ResNet. Then, a concatenated feature map is acquired by concatenating the 3 feature maps based on the frame sequence. A classification result of whether an action is contained is acquired by processing the concatenated feature map by the first FC layer.

Figure 7:
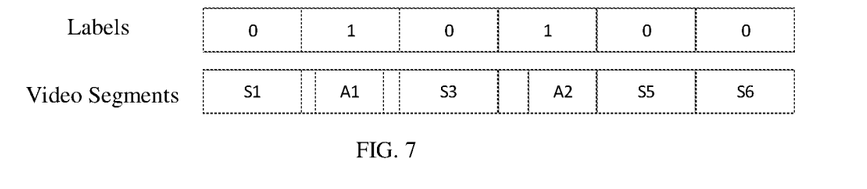
FIG. 7 is a schematic diagram of action labels according to some embodiments of the present disclosure.

FIG. 7 is a schematic diagram of action labels according to some embodiments of the present disclosure. The last 2 circles in FIG. 5 indicate that the output is binary classification. The action label is determined as binary classification to ensure that the recall of segments containing an action is improved. A label granularity is whether an action is contained. Only a binary classification level of "yes" or "no" is designed, that is, which action is contained is not cared. As shown in FIG. 7, during model training, a short video used for training is divided into 6 segments. A segment S2 contains an action A1. A segment S4 contains an action A2. A1 and A2 are 2 different actions. However, labels corresponding to the 2 actions are the same, and both are set to 1. That is, a difference between the actions A1 and A2 is not distinguished. Therefore, in practical application, the output result of the first predetermined model is also "yes" or "no," and coarse-grained recognition of the action in the compressed video is implemented.

In 405, to-be-recognized grouped video data is acquired by decoding the target grouped video data.

In 406, the to-be-recognized grouped video data is input into a second predetermined model, and a type of an action contained in the to-be-recognized grouped video data is determined based on an output result of the second predetermined model.

In the action recognition method provided in the embodiments of the present disclosure, action recognition is performed based on the compressed video. The I frame, and MV and RGBR information of the P frame are extracted without decompressing the video. The MV and RGBR are changed to increase information dependence on the I frame. In this way, a large number of videos with indefinite duration is processed with less computing power requirements. Extraction of the time sequence information by the model is added through FS without computing power requirements. Computing efficiency is not reduced when a capability of the model is enhanced. The label granularity of the action is redesigned to ensure a recall goal. The model is used to process a simple binary classification problem, such that the recall rate is improved. Preliminarily screened video segments containing an action are accurately recognized. A computing amount is effectively reduced on the premise of ensuring recognition accuracy, and action recognition efficiency is improved.

In some embodiments, acquiring the to-be-recognized grouped video data by decoding the target grouped video data includes: acquiring a to-be-recognized segmented video image by decoding the target grouped video data; acquiring frequency domain (FD) information in the to-be-recognized segmented video image, and generating a corresponding FD graph based on the FD information; and determining the to-be-recognized segmented video image and the corresponding FD graph as the to-be-recognized grouped video data. In the technical solutions provided in the embodiments of the present disclosure, image information is enriched, and accuracy of the second predetermined model is improved.

In some embodiments, the second predetermined model includes a model based on an efficient convolutional network for online video understanding (ECO) architecture. The ECO architecture is understood as a video feature extractor, and provides architecture design for acquiring video features, which includes a 2D feature extraction network and a 3D feature extraction network. The architecture improves speed while delivering good performance. In some embodiments of the present disclosure, the second predetermined model is acquired by performing improvement and design based on the ECO architecture.

In some embodiments, the second predetermined model includes a second concatenation layer, a second 2D residual network, a 3D residual network, a third concatenation layer, and a second FC layer. Concatenated image data is acquired by inputting the to-be-recognized grouped video data into the second predetermined model and concatenating the to-be-recognized segmented video image and the corresponding FD graph in the to-be-recognized grouped video data by the second concatenation layer; a 2D feature map is acquired by processing the concatenated image data by the second 2D residual network; a 3D feature map is acquired by inputting an intermediate layer output result of the second 2D residual network into the 3D residual network and processing the intermediate layer output result by the 3D residual network; a to-be-recognized concatenated feature map is acquired by concatenating the 2D feature map and the 3D feature map by the third concatenation layer; and a corresponding action type label is acquired by processing the to-be-recognized feature map by the second FC layer. In the technical solutions provided in the embodiments of the present disclosure, based on the ECO architecture, the intermediate layer output result of the second 2D residual network is determined as the input of the 3D residual network, such that the network structure is re-utilized, and a model speed is improved.

In some embodiments, the to-be-recognized grouped video data first enters a 2D convolution part of the model to extract the feature of each image, and then enters a 3D convolution part to extract the time sequence information of the action, and finally, a multi-classification result is output. The network structures and parameters of the second 2D residual network and the 3D residual network may be determined based on actual requirements. In some embodiments, the second 2D residual network is 2D Res50, and the 3D residual network is 3D Res10.

In some embodiments, the second predetermined model further includes a first pooling layer and a second pooling layer. A one-dimensional 2D eigenvector containing a first number of elements is acquired by processing the 2D feature map by the first pooling layer prior to being input into the third concatenation layer. A one-dimensional 3D eigenvector containing a second number of elements is acquired by processing the 3D feature map by the second pooling layer prior to being input into the third concatenation layer. Correspondingly, acquiring the to-be-recognized concatenated feature map by concatenating the 2D feature map and the 3D feature map by the third concatenation layer includes: acquiring a to-be-recognized concatenated vector by concatenating the one-dimensional 2D eigenvector and the one-dimensional 3D eigenvector by the third concatenation layer. In the technical solutions provided in the embodiments of the present disclosure, the feature map still has a large size after feature extraction is performed by the convolution layer. If the feature map is directly flattened at this time, the dimension of the eigenvector may be too high. Therefore, after a series of feature extraction operations are performed by the 2D and 3D residual networks, the feature maps are directly aggregated into the one-dimensional eigenvector through the pooling to reduce the dimension of the eigenvector. The first pooling layer and the second pooling layer may be designed based on actual requirements, such as global average pooling (GAP) or maximum pooling. The first number of elements and the second number of elements may also be freely determined, for example, they are determined based on the number of channels of the feature map.

In some embodiments, the first pooling layer includes a multi-receptive-field pooling layer. The receptive field generally refers to an image or video range covered by an eigenvalue, and is configured to represent receptive ranges of different neurons in the network for an original image, or a size of an area mapped by a pixel on the feature map output by each layer of the convolutional neural network on the original image. A larger receptive field indicates a larger range of the original image that can be touched, and also indicates that a contained feature is more global and have a higher semantic level. Conversely, a smaller receptive field indicates that a contained feature is more local and detailed. Therefore, the receptive field is used to roughly determine an abstraction level of each layer. An advantage of using the multi-receptive-field pooling layer is that the feature is sensitive to objects with different scales, such that a recognition range of the type of the action is broadened. The manner of implementing a plurality of receptive fields may be determined based on actual requirements.

In some embodiments, the first pooling layer includes a first-level local pooling layer, a second-level global pooling layer, and a vector merging layer. The first-level local pooling layer contains at least two pooling kernels with different sizes. At least two groups of 2D pooled feature maps with different scales are acquired by processing the 2D feature map by the first-level local pooling layer. At least two groups of eigenvectors are acquired by processing the at least two groups of 2D pooled feature maps with different scales by the second-level global pooling layer. The one-dimensional 2D eigenvector containing the first number of elements is acquired by processing the at least two groups of eigenvectors by the vector merging layer. In the technical solutions provided in the embodiments of the present disclosure, the feature map is aggregated by performing the two-level multi-receptive-field pooling, and multi-scale pooling is performed by using the pooling kernels with different sizes, such that aggregated features have different receptive fields. In addition, the size of the feature map is greatly reduced, and the recognition efficiency is improved. Then, the features are aggregated through the second-level global pooling, and the one-dimensional 2D eigenvector is acquired by using the vector merging layer.

Figure 8:
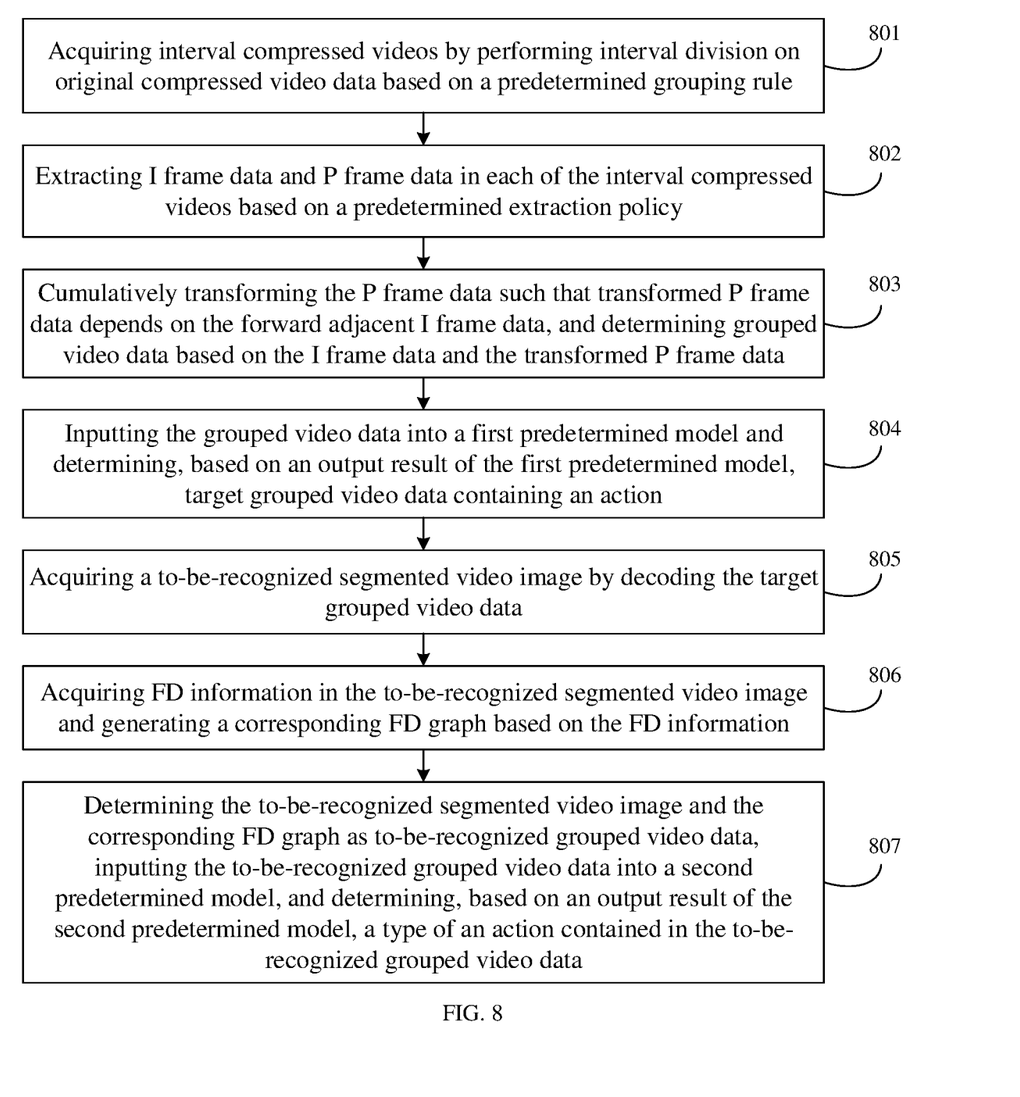
FIG. 8 is a schematic flowchart of another action recognition method according to some embodiments of the present disclosure.
Figure 9:
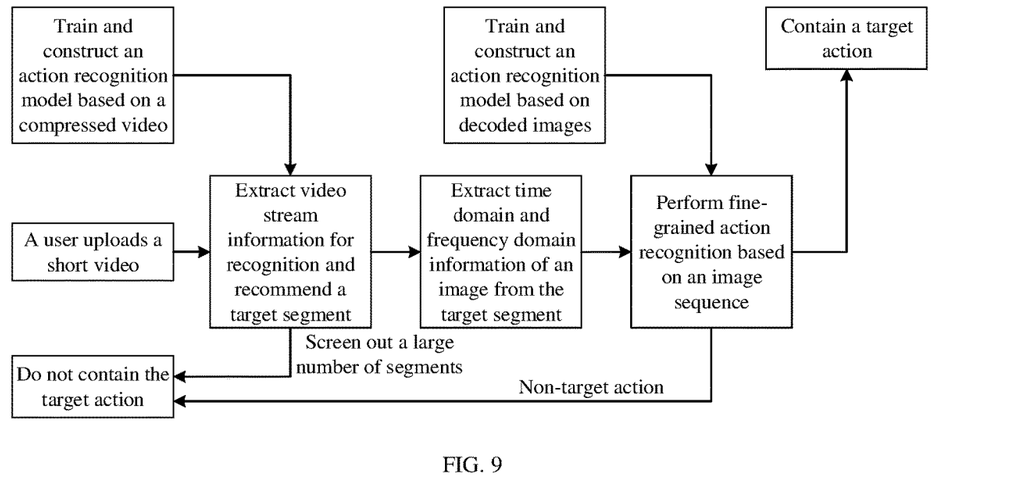
FIG. 9 is a schematic diagram of an application scenario of action recognition based on a short video according to some embodiments of the present disclosure.

FIG. 8 is a schematic flowchart of another action recognition method according to some embodiments of the present disclosure. Refinement is performed based on the foregoing exemplary embodiments. A short video review scenario is taken as an example. FIG. 9 is a schematic diagram of an application scenario of action recognition based on a short video according to some embodiments of the present disclosure. As shown in FIG. 9, compressed video stream information is extracted after a user uploads a short video. A target segment containing an action is recognized by using a pre-trained and constructed action recognition model (first predetermined model) based on a compressed video, and a large number of segments not containing an action are screened out. Then, the target segment is decoded and time domain and frequency domain (FD) information of an image is extracted. A type of an action corresponding to each target segment is acquired by using a pre-trained and constructed action recognition model (second predetermined model) based on decoded images to perform finer-grained action recognition based on an image sequence. It is determined whether the action is a target action. If the action is not the target action, the corresponding segment is also screened out.

For example, the method includes the following processes.

In 801, interval compressed videos are acquired by performing interval division on original compressed video data based on a predetermined grouping rule.

The original compressed video data is the video stream data of the short video uploaded by the user, and duration of each interval compressed video may be 5 seconds.

In 802, I frame data and P frame data in each of the interval compressed videos are extracted based on a predetermined extraction policy.

The P frame data includes an MV and RGBR corresponding to a P frame. 1 I frame and subsequent 2 P frames are acquired every second. That is, 5 I frames, 10 MVs, and 10 RGBRs are acquired from a 5-second segment.

In 803, the P frame data is cumulatively transformed such that transformed P frame data depends on the forward adjacent I frame data, and grouped video data is determined based on the I frame data and the transformed P frame data.

In 804, the grouped video data is input into a first predetermined model, and target grouped video data containing an action is determined based on an output result of the first predetermined model.

In 805, a to-be-recognized segmented video image is acquired by decoding the target grouped video data.

For example, the target grouped video data is decoded into images, and sequence images are acquired by sequencing the images in time order. In some embodiments, to reduce an amount of data to be recognized, a specified number of images are acquired from the sequence images based on a predetermined acquiring policy as the to-be-recognized segmented video image. For example, the predetermined acquiring policy is equal-interval acquiring, and the specified number is 15.

In 806, frequency domain (FD) information in the to-be-recognized segmented video image is acquired, and a corresponding FD graph is generated based on the FD information.

A manner in which the FD information is acquired is not limited. The FD information is acquired for each of the sequence images, and FD graphs one-to-one corresponding to the sequence images are generated.

In 807, the to-be-recognized segmented video image and the corresponding FD graph are determined as to-be-recognized grouped video data, the to-be-recognized grouped video data is input into a second predetermined model, and a type of an action contained in the to-be-recognized grouped video data is determined based on an output result of the second predetermined model.

For example, sequence images in one segment and corresponding FD graphs correspond to one label in multi-classification labels. That is, in the output result of the second predetermined model, each segment corresponds to one label. In a case that one segment contains a plurality of actions, the model determines a type corresponding to a main action as a label of the segment. For example, in a case that a 5-second segment A has 4 seconds of action, wherein 3 seconds of action is waving, and 1 second of action is kicking, an action label for the segment A is waving.

Figure 10:
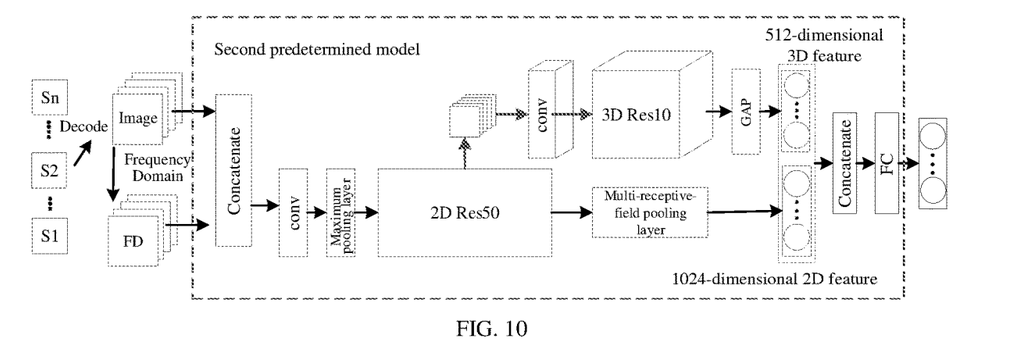
FIG. 10 is a schematic diagram of an action recognition process based on sequence images according to some embodiments of the present disclosure.

FIG. 10 is a schematic diagram of an action recognition process based on sequence images according to some embodiments of the present disclosure. A value of n is generally different from a value of n in FIG. 5. A segment S2 is taken as an example. Sequence images are acquired after the decoding. A corresponding FD graph is generated after FD information is extracted. The second predetermined model is designed based on the ECO architecture, and includes a second concatenation layer, a second 2D residual network, a 3D residual network, a first pooling layer, a second pooling layer, a third concatenation layer, and a second FC layer. In some embodiments, during training of the second predetermined model, a training manner, a loss function or the like are selected based on actual requirements. For example, the loss function uses cross entropy. Other auxiliary loss functions are further used to improve a model effect. In addition, some non-heuristic optimization algorithms may be used to improve a convergence speed of stochastic gradient descent and optimize performance. As shown in FIG. 10, concatenated image data is acquired by processing the decoded sequence images and the corresponding FD graphs by the second concatenation layer in the second predetermined model. In some embodiments, the concatenated image data is further processed by a convolution layer (conv) and a maximum pooling layer (maxpool), and then input into the second 2D residual network (2D Res50). A 1024-dimensional 2D eigenvector (which can be understood as a one-dimensional row vector or column vector containing 1024 elements) is acquired after the output of 2D Res50 is processed by the first pooling layer (multi-receptive-field pooling layer). An intermediate output result of 2D Res50 is determined as the input of the 3D residual network (3D Res10), and a 512-dimensional 3D eigenvector is acquired after the intermediate result of 2D Res50 is processed by the second pooling layer (GAP). A to-be-recognized feature map, namely, to-be-recognized eigenvector is acquired by concatenating the 1024-dimensional 2D eigenvector and the 512-dimensional 3D eigenvector by the third concatenation layer. Finally, an action type label is acquired after the to-be-recognized feature map is processed by the second FC layer.

Figure 11:
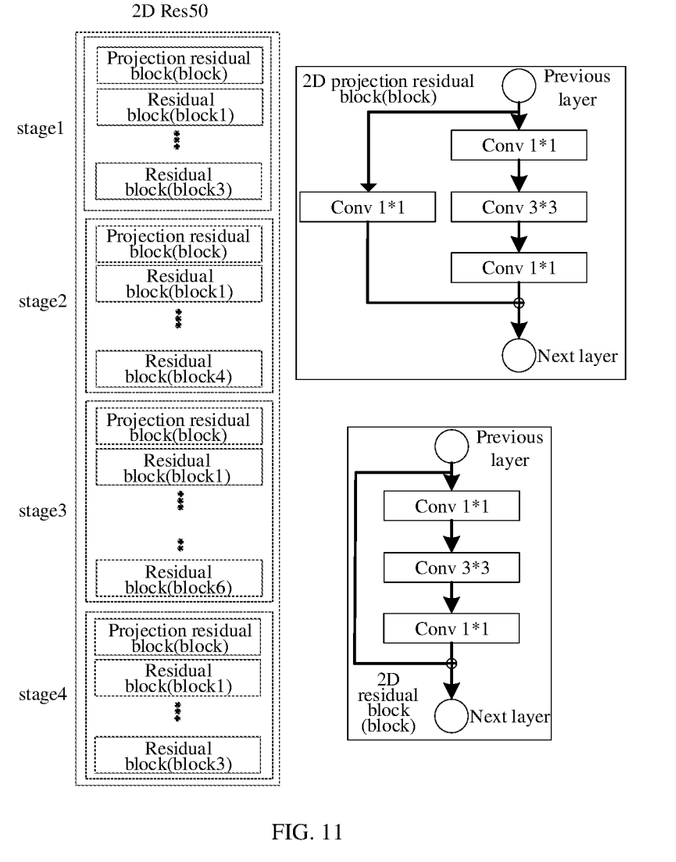
FIG. 11 is a schematic diagram of a structure of a second 2D residual network according to some embodiments of the present disclosure.

FIG. 11 is a schematic diagram of a structure of a second 2D residual network according to some embodiments of the present disclosure. As shown in the figure, the second 2D residual network is 2D Res50, which is a 50-layer residual neural network composed of 16 residual blocks using 2D convolution in 4 stages. To reduce a number of channels for the operation of a convolution layer and further reduce a number of parameters, each residual block uses a design concept of bottleneck, that is, each residual block is composed of 3 convolution layers, wherein the two 1*1 convolution layers at the inlet and outlet are separately used to compress and restore the number of channels of the feature map. In addition, because the size of the feature map needs to be reduced to a quarter and the channel needs to be expanded to two times in each stage, a 2D projection residual block is used at the inlet of each stage, and a 1*1 convolution layer is added, by the residual block, in the bypass to ensure that the size of the feature map and the number of channels are kept consistent during pixel-by-pixel addition. Similarly, network parameters are reduced by only using the 2D projection residual blocks at the inlet of each stage.

Figure 12:
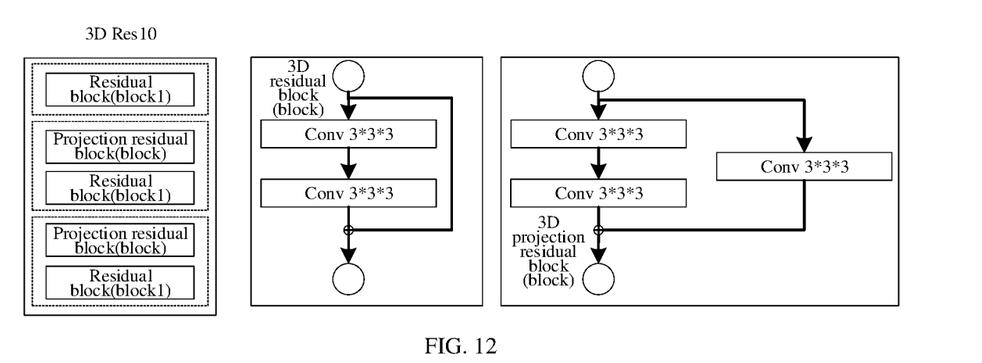
FIG. 12 is a schematic diagram of a structure of a 3D residual network according to some embodiments of the present disclosure.

FIG. 12 is a schematic diagram of a structure of a 3D residual network according to some embodiments of the present disclosure. An intermediate layer feature map group is acquired by processing N video frames acquired from each segment (as described above, frame images acquired by concatenating the 15 images acquired from the sequence images and the corresponding FD graphs) by 2D Res50. For example, a feature map group from stage2-block4 is assembled into a three-dimensional video tensor. A shape of the tensor is (c, f, h, w), wherein c represents the number of channels of the frame images, f represents the number of video frames, h represents a height of the frame image, and w represents a width of the frame image. A spatio-temporal feature of the entire video is extracted by inputting the video tensor into 3D Res10. As shown in FIG. 12, 3D Res10 is composed of only 5 residual blocks in 3 stages. All convolution layers use three-dimensional convolution kernels. During convolution, information in a time dimension also participates in computing. To reduce network parameters, 3D Res10 uses residual blocks with fewer convolution layers, and a channel number expansion technique used in bottleneck residual blocks is removed.

Figure 13:
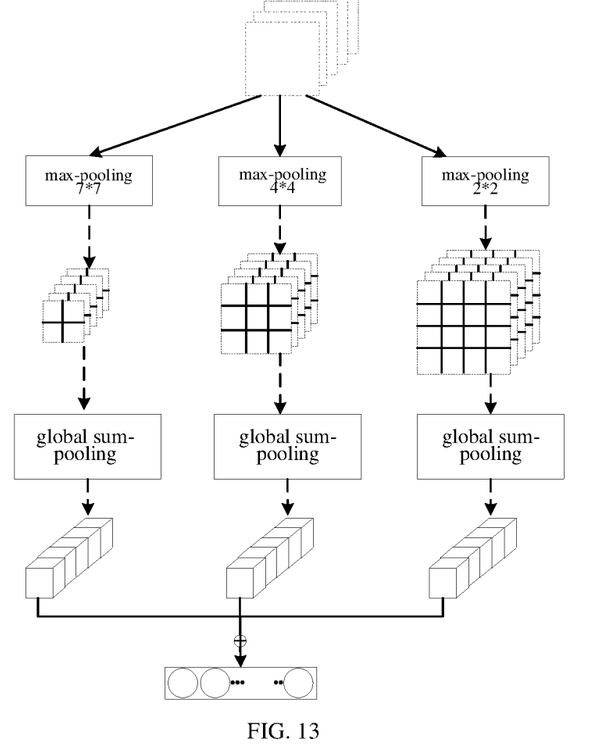
FIG. 13 is a schematic diagram of two-level multi-receptive-field pooling according to some embodiments of the present disclosure.

For example, after the convolution is completed, 3D Res10 averages pixel values in a spatio-temporal range through global average pooling to acquire a 512-dimensional video spatio-temporal eigenvector. A kernel size of the global average pooling layer may be 2*7*7. 2D Res50 is different from a general convolutional neural network in that the feature map is aggregated through two-level multi-receptive-field pooling instead of simple global pooling. FIG. 13 is a schematic diagram of two-level multi-receptive-field pooling according to some embodiments of the present disclosure. As shown in FIG. 13, during first-level local pooling, pixels on the 2D feature map (sizes of the three maximum pooling kernels are 7*7, 4*4, and 2*2) are aggregated by using three maximum pooling (max-pooling) layers with different aggregation ranges (pooling kernels). The pooling kernels with different sizes enable aggregated features to have different receptive fields, such that the features are sensitive to objects with different scales, and a recognition range of object categories is broadened. After the first-level multi-scale local pooling is performed, three groups of 2D pooled feature maps with greatly reduced sizes are acquired, and these 2D pooled feature maps include video features of different scales. Then, second-level global sum-pooling is performed on the three groups of feature maps. A feature is acquired by summing pixel values of feature maps on each channel. The three groups of feature maps are aggregated into three eigenvectors containing video spatial information of different scales. Finally, a 1024-dimensional 2D eigenvector (as shown by the bottommost circle in FIG. 13) is acquired by performing pixel-by-pixel addition on the three eigenvectors. Through the foregoing process, N 1024-dimensional 2D eigenvectors are acquired by processing N (15 as described above) frames of the video. A 2D eigenvector representing spatial information of the entire video (namely, the 1024-dimensional 2D eigenvector shown in FIG. 10) can be acquired by summing and averaging the eigenvectors of these frames.

In the action recognition method provided in the embodiments of the present disclosure, based on the foregoing embodiments, during the action recognition based on the sequence images, the FD information is extracted from the decoded images and concatenated into the images, such that richness of information extracted by a feature network is increased. The ECO network structure is used, and after 2D and 3D information is extracted, the information is pooled in different manners and fused into a one-dimensional vector to be recognized, such that more labels are classified on the network, and higher-accuracy recognition is provided. Because a large number of non-target action videos are screened out during the action recognition based on the compressed video stream, a small number of videos are input during the action recognition based on the sequence images, during which computing power requirements are high. For the two parts of action recognition, when the action recognition accuracy is ensured, all video detection tasks are completed with very low computing power requirements. Recognition efficiency is effectively improved, and the computing power requirements, recall rate, and recognition accuracy are well balanced.

Figure 14:
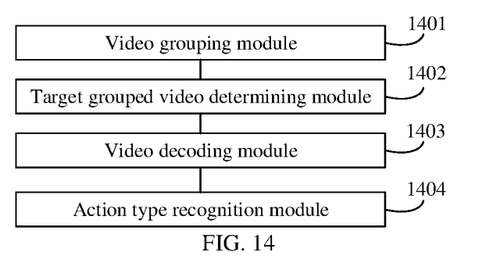
FIG. 14 is a block diagram of a structure of an action recognition apparatus according to some embodiments of the present disclosure.

FIG. 14 is a block diagram of a structure of an action recognition apparatus according to some embodiments of the present disclosure. The apparatus is implemented by software and/or hardware and generally integrated in a computer device. The apparatus performs action recognition by performing the action recognition method. As shown in FIG. 14, the apparatus includes: a video grouping module 1401, a target grouped video determining module 1402, a video decoding module 1403 and an action type recognition module 1404.

The video grouping module 1401 is configured to acquire grouped video data by grouping original compressed video data.

The target grouped video determining module 1402 is configured to input the grouped video data into a first predetermined model and determine, based on an output result of the first predetermined model, target grouped video data containing an action.

The video decoding module 1403 is configured to acquire to-be-recognized grouped video data by decoding the target grouped video data.

The action type recognition module 1404 is configured to input the to-be-recognized grouped video data into a second predetermined model and determine, based on an output result of the second predetermined model, a type of an action contained in the to-be-recognized grouped video data.

In the action recognition apparatus provided in the embodiments of the present disclosure, before a compressed video is decompressed, a video segment containing an action is acquired by using the first predetermined model to perform rough screening, and then the type of the contained action is accurately recognized by using the second predetermined model, such that a computing amount is effectively reduced on the premise of ensuring recognition accuracy, and action recognition efficiency is improved.

Figure 15:
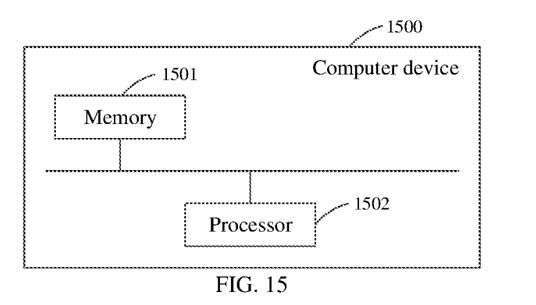
FIG. 15 is a block diagram of a structure of a computer device according to some embodiments of the present disclosure.

A computer device is provided in the embodiments of the present disclosure. The action recognition apparatus provided in the embodiments of the present disclosure may be integrated in the computer device. FIG. 15 is a block diagram of a structure of a computer device according to some embodiments of the present disclosure. A computer device 1500 includes: a memory 1501 and a processor 1502. A computer program is stored in the memory 1501 and executable on the processor 1502. The processor 1502, when loading and executing the computer program, is caused to perform the action recognition method provided in the embodiments of the present disclosure.

A storage medium storing at least one computer-executable instruction therein is further provided in the embodiments of the present disclosure. The at least one computer-executable instruction, when loaded and executed by a computer processor, causes the computer processor to perform the action recognition method provided in the embodiments of the present disclosure.

The action recognition apparatus, device, and storage medium provided in the foregoing embodiments perform the action recognition method provided in any one of the embodiments of the present disclosure, and have corresponding functional modules for performing the method. For technical details not described in detail in the foregoing embodiments, reference is made to the action recognition method provided in any one of the embodiments of the present disclosure.

Please note that the foregoing embodiments are merely exemplary embodiments of the present disclosure. It is understandable to those skilled in the art that the present disclosure is not limited to the specific embodiments described herein. Various obvious changes, adjustments, and substitutions can be made by those skilled in the art, and do not depart from the protection scope of the present disclosure. Therefore, although the present disclosure has been described in detail by using the foregoing embodiments, the present disclosure is not limited to the foregoing embodiments, and can also include more other equivalent embodiments without departing from the concept of the present disclosure, and the scope of the present disclosure is determined by the scope of the appended claims.

What is claimed is:

1. An action recognition method, comprising:
   acquiring grouped video data by grouping original compressed video data;
   inputting the grouped video data into a first predetermined model and determining, based on an output result of the first predetermined model, target grouped video data containing an action;
   acquiring to-be-recognized grouped video data by decoding the target grouped video data; and
   inputting the to-be-recognized grouped video data into a second predetermined model and determining, based on an output result of the second predetermined model, a type of an action contained in the to-be-recognized grouped video data;
   wherein acquiring the to-be-recognized grouped video data by decoding the target grouped video data comprises:
      acquiring a to-be-recognized segmented video image by decoding the target grouped video data;
      acquiring frequency domain information in the to-be-recognized segmented video image and generating a corresponding frequency domain graph based on the frequency domain information; and
      determining the to-be-recognized segmented video image and the corresponding frequency domain graph as the to-be-recognized grouped video data.

2. The method according to claim 1, wherein acquiring the grouped video data by grouping the original compressed video data comprises:
   acquiring interval compressed videos by performing interval division on the original compressed video data based on a predetermined grouping rule; and
   acquiring the grouped video data by extracting I frame data and P frame data in each of the interval compressed videos based on a predetermined extraction policy, wherein the P frame data comprises at least one of the following information corresponding to a P frame: motion vector information and pigment change residual information.

3. The method according to claim 2, wherein the first predetermined model comprises a first 2D residual network, a first concatenation layer, and a first fully connected layer; wherein
   feature maps with a same dimension are acquired by inputting the grouped video data into the first predetermined model and processing the grouped video data by the first 2D residual network;
   a concatenated feature map is acquired by concatenating the feature maps by the first concatenation layer based on a frame sequence; and
   a classification result indicating whether an action is contained is acquired by processing the concatenated feature map by the first fully connected layer.

4. The method according to claim 3, wherein
   acquiring the grouped video data by extracting the I frame data and the P frame data in each of the interval compressed videos based on the predetermined extraction policy comprises:
      extracting the I frame data and the P frame data in each of the interval compressed videos based on the predetermined extraction policy;
      cumulatively transforming the P frame data such that transformed P frame data depends on forward adjacent I frame data; and
      determining the grouped video data based on the I frame data and the transformed P frame data; and
   the first predetermined model further comprises an addition layer located before the concatenation layer, a feature map corresponding to the P frame data in the feature maps is denoted as a P frame feature map, and a feature map corresponding to the I frame data in the feature maps is denoted as an I frame feature map; wherein
      a P frame feature map to which the I frame feature map is added is acquired by processing the P frame feature map and the I frame feature map by the addition layer; and
      the concatenated feature map is acquired by concatenating the I frame feature map and the P frame feature map acquired upon the addition by the first concatenation layer based on the frame sequence.

5. The method according to claim 3, wherein
   a feature shift layer is comprised in the first predetermined model, wherein the feature shift layer is before a residual structure of the first 2D residual network; and
   at least one of up-shifted grouped video data and down-shifted grouped video data is acquired by processing the grouped video data by the feature shift layer prior to being input into the residual structure.

6. The method according to claim 2, wherein extracting the P frame data in each of the interval compressed video based on the predetermined extraction policy comprises:
   extracting a predetermined number of P frame data in each of the interval compressed videos in an equal-interval manner;
   wherein a predetermined number of P frame data in each of the interval compressed videos is extracted in a random-interval manner during training of the first predetermined model.

7. The method according to claim 1, wherein the second predetermined model comprises a model based on an efficient convolutional network for online video understanding (ECO) architecture.

8. The method according to claim 7, wherein the second predetermined model comprises a second concatenation layer, a second 2D residual network, a 3D residual network, a third concatenation layer, and a second fully connected layer; wherein
   concatenated image data is acquired by inputting the to-be-recognized grouped video data into the second predetermined model and concatenating the to-be-recognized segmented video image and the corresponding frequency domain graph by the second concatenation layer;
   a 2D feature map is acquired by processing the concatenated image data by the second 2D residual network;
   a 3D feature map is acquired by inputting an intermediate layer output result of the second 2D residual network into the 3D residual network and processing the intermediate layer output result by the 3D residual network;

a to-be-recognized feature map is acquired by concatenating the 2D feature map and the 3D feature map by the third concatenation layer; and a corresponding action type label is acquired by processing the to-be-recognized feature map by the second fully connected layer.

9. The method according to claim 8, wherein the second predetermined model further comprises a first pooling layer and a second pooling layer; wherein a one-dimensional 2D eigenvector containing a first number of elements is acquired by processing the 2D feature by the first pooling layer prior to being input into the third concatenation layer;

a one-dimensional 3D eigenvector containing a second number of elements is acquired by processing the 3D feature map by the second pooling layer prior to being input into the third concatenation layer; and acquiring the to-be-recognized concatenated feature map by concatenating the 2D feature map and the 3D feature map by the third concatenation layer comprises:

acquiring a to-be-recognized concatenated vector by concatenating the one-dimensional 2D eigenvector and the one-dimensional 3D eigenvector by the third concatenation layer.

10. The method according to claim 9, wherein the first pooling layer comprises a multi-receptive-field pooling layer.

11. The method according to claim 10, wherein the first pooling layer comprises a first-level local pooling layer, a second-level global pooling layer, and a vector merging layer, the first-level local pooling layer containing at least two pooling kernels with different sizes; wherein at least two groups of 2D pooled feature maps with different scales are acquired by processing the 2D feature map by the first-level local pooling layer;

at least two groups of eigenvectors are acquired by processing the at least two groups of 2D pooled feature maps with different scales by the second-level global pooling layer; and the one-dimensional 2D eigenvector containing the first number of elements is acquired by processing the at least two groups of eigenvectors by the vector merging layer.

12. An action recognition computer device, comprising: a memory, a processor, and a computer program stored in the memory and executable on the processor, wherein the processor, when loading and executing the computer program, is caused to perform:

acquiring grouped video data by grouping original compressed video data;

inputting the grouped video data into a first predetermined model and determining, based on an output result of the first predetermined model, target grouped video data containing an action;

acquiring to-be-recognized grouped video data by decoding the target grouped video data; and inputting the to-be-recognized grouped video data into a second predetermined model and determining, based on an output result of the second predetermined model, a type of an action contained in the to-be-recognized grouped video data;

wherein acquiring the to-be-recognized grouped video data by decoding the target grouped video data comprises:

acquiring a to-be-recognized segmented video image by decoding the target grouped video data;

acquiring frequency domain information in the to-be-recognized segmented video image and generating a corresponding frequency domain graph based on the frequency domain information; and determining the to-be-recognized segmented video image and the corresponding frequency domain graph as the to-be-recognized grouped video data.

13. A non-transitory computer-readable storage medium storing a computer program therein, wherein the computer program, when loaded and executed by a processor, causes the processor to perform:

acquiring grouped video data by grouping original compressed video data;

inputting the grouped video data into a first predetermined model and determining, based on an output result of the first predetermined model, target grouped video data containing an action;

acquiring to-be-recognized grouped video data by decoding the target grouped video data; and inputting the to-be-recognized grouped video data into a second predetermined model and determining, based on an output result of the second predetermined model, a type of an action contained in the to-be-recognized grouped video data;

wherein acquiring the to-be-recognized grouped video data by decoding the target grouped video data comprises:

acquiring a to-be-recognized segmented video image by decoding the target grouped video data;

acquiring frequency domain information in the to-be-recognized segmented video image and generating a corresponding frequency domain graph based on the frequency domain information; and determining the to-be-recognized segmented video image and the corresponding frequency domain graph as the to-be-recognized grouped video data.

14. The action recognition computer device according to claim 12, wherein the processor, when loading and executing the computer program, is caused to perform:

acquiring interval compressed videos by performing interval division on the original compressed video data based on a predetermined grouping rule; and acquiring the grouped video data by extracting I frame data and P frame data in each of the interval compressed videos based on a predetermined extraction policy, wherein the P frame data comprises at least one of the following information corresponding to a P frame: motion vector information and pigment change residual information.

15. The action recognition computer device according to claim 14, wherein the first predetermined model comprises a first 2D residual network, a first concatenation layer, and a first fully connected layer; wherein feature maps with a same dimension are acquired by inputting the grouped video data into the first predetermined model and processing the grouped video data by the first 2D residual network;

a concatenated feature map is acquired by concatenating the feature maps by the first concatenation layer based on a frame sequence; and a classification result indicating whether an action is contained is acquired by processing the concatenated feature map by the first fully connected layer.

16. The action recognition computer device according to claim 15, wherein the processor, when loading and executing the computer program, is caused to perform:

extracting the I frame data and the P frame data in each of the interval compressed videos based on the predetermined extraction policy;

cumulatively transforming the P frame data such that transformed P frame data depends on forward adjacent I frame data; and determining the grouped video data based on the I frame data and the transformed P frame data; and the first predetermined model further comprises an addition layer located before the concatenation layer, a feature map corresponding to the P frame data in the feature maps is denoted as a P frame feature map, and a feature map corresponding to the I frame data in the feature maps is denoted as an I frame feature map; wherein a P frame feature map to which the I frame feature map is added is acquired by processing the P frame feature map and the I frame feature map by the addition layer; and the concatenated feature map is acquired by concatenating the I frame feature map and the P frame feature map acquired upon the addition by the first concatenation layer based on the frame sequence.

17. The action recognition computer device according to claim 15, wherein a feature shift layer is comprised in the first predetermined model, wherein the feature shift layer is before a residual structure of the first 2D residual network; and at least one of up-shifted grouped video data and down-shifted grouped video data is acquired by processing the grouped video data by the feature shift layer prior to being input into the residual structure.

18. The action recognition computer device according to claim 14, wherein the processor, when loading and executing the computer program, is caused to perform:

extracting a predetermined number of P frame data in each of the interval compressed videos in an equal-interval manner;

wherein a predetermined number of P frame data in each of the interval compressed videos is extracted in a random-interval manner during training of the first predetermined model.

* * * * *